Patented Oct. 14, 1941

2,259,167

UNITED STATES PATENT OFFICE 2,259,167

CYANHYDRIN INTERCHANGE

Frederick E. Küng, Akron, Ohio, assignor to The B. F. Goodrich Company, New York, N. Y., a corporation of New York No Drawing. Application June 4, 1940, Serial No. 338,756

12 Claims. (Cl. 260—464)

This invention relates to a process for the preparation of cyanhydrins and more particularly to a process for the conversion of one cyanhydrin to another by means of a cyanhydrin interchange reaction.

Aldehyde and ketone cyanhydrins have recently become of increased importance as intermediates in the synthesis of many industrial organic chemicals. For example, acrylic nitriles, which are widely used in polymerization, may be obtained in good yields by the pyrolysis of the acetyl derivatives of certain aldehyde or ketone cyanhydrins. It is desirable, therefore, that a method be provided by which these cyanhydrins may be prepared in good yields at the lowest possible cost.

Heretofore, the corresponding cyanhydrins have been prepared by the reaction of aldehydes or ketones with hydrocyanic acid in the presence of an organic base such as pyridine or of some other suitable alkaline catalyst such as an oxide, hydroxide, carbonate or cyanide of an alkali or alkaline earth metal. When this reaction is performed using anhydrous hydrocyanic acid it is necessary that the temperature and concentrations of the reactants be controlled very closely, otherwise polymerizations and/or decompositions occur and the cyanhydrin is obtained in unsatisfactory yields and in a state of insufficient purity. On the other hand, if aqueous hydrocyanic acid, which may be prepared by the action of an inorganic acid on a metal cyanide in aqueous solution, is reacted with a low molecular aldehyde such as acetaldehyde, it is difficult to separate the cyanhydrin from the aqueous salt solution.

This invention has as one of its objects to provide a new method of preparing cyanhydrins not subject to the above mentioned disadvantages. Another object is to provide a method of producing aldehyde or ketone cyanhydrins in good yields without the necessity of preparing anhydrous hydrogen cyanide. Still another object is to provide a convenient method for the preparation of cyanhydrins of aldehydes or ketones of low molecular weight which can not be separated easily from aqueous solution. The attainment of these and other objects will be apparent from the following description of this invention.

The essence of this invention resides in the discovery that a cyanhydrin A, will react with an aldehyde or ketone B, in the presence of an alkaline catalyst to yield the cyanhydrin of the first aldehyde or ketone, C, and another aldehyde or ketone, D. The equation for the reaction may be represented as:

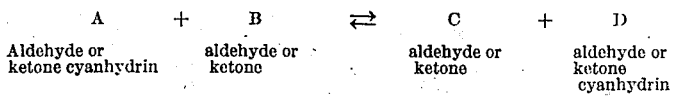

| A | + | B | ⇌ | C | + | D |
|---|---|---|---|---|---|---|
| Aldehyde or ketone cyanhydrin | | aldehyde or ketone | | aldehyde or ketone | | aldehyde or ketone cyanhydrin |

This reaction is not confined to any particular compounds but is applicable to the broad class of aldehyde or ketone cyanhydrins. Thus the original aldehyde or ketone employed, B, may be a symmetrical or asymmetrical alkyl, aryl, aralkyl or cyclic ketone such, for example, as acetone, methyl ethyl ketone, diethyl ketone, methyl propyl ketone, methyl isobutyl ketone, ethyl propyl ketone, benzophenone, methyl benzyl ketone, methyl cyclohexyl ketone and the like, or it may be an alkyl, aryl or aralkyl aldehyde such, for example, as acetaldehyde, propionaldehyde, butyraldehyde, benzaldehyde and the like or an equivalent or homolog of any of these aldehydes or ketones. Likewise the original cyanhydrin, A, may be the cyanhydrin of any of the above described aldehydes or ketones or of their equivalents or homologs.

Since this cyanhydrin interchange reaction as defined above is reversible, an equilibrium is established between the concentrations of the products and the reactants. The equilibrium constant for the reaction may be expressed in terms of concentrations as:

$$K = \frac{(C)(D)}{(A)(B)}$$

In view of this equilibrium it is desirable in the practice of this invention that one of two conditions be fulfilled in order to obtain good yields of the desired products.

These conditions are:

(1) The reactants should be chosen so that, at equilibrium, the concentrations of the reactants are very small in comparison to the concentrations of the products, i. e. K for the reaction should be large.

(2) Means should be provided whereby the equilibrium is continuously displaced toward the right as the reaction proceeds.

In carrying out the reaction according to condition (1) above it will be necessary to select an original aldehyde or ketone cyanhydrin, A, which has a larger dissociation constant than the aldehyde or ketone cyanhydrin which is formed, D.

The dissociation constants of aldehyde and ketone cyanhydrins stand in general in the following order, the compounds at the top of the list having the largest constants:

Aryl ketone cyanhydrins
Aralkyl ketone cyanhydrins
Cyclic ketone cyanhydrins
Alkyl ketone cyanhydrins
Aryl aldehyde cyanhydrins
Aralkyl aldehyde cyanhydrins
Alkyl aldehyde cyanhydrins When a cyanhydrin is reacted with an aldehyde or ketone whose cyanhydrin is lower in the above list than the original cyanhydrin, the reaction proceeds substantially to completion since at equilibrium K will be large. In many cases compound B in the general reaction will be an aldehyde while compound D will be a ketone. Typical examples of the practice of this invention according to condition (1) are, accordingly, as follows:

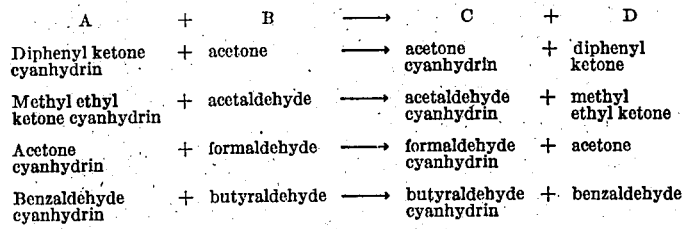

| A | + | B | ⟶ | C | + | D |
|---|---|---|---|---|---|---|
| Diphenyl ketone cyanhydrin | + | acetone | ⟶ | acetone cyanhydrin | + | diphenyl ketone |
| Methyl ethyl ketone cyanhydrin | + | acetaldehyde | ⟶ | acetaldehyde cyanhydrin | + | methyl ethyl ketone |
| Acetone cyanhydrin | + | formaldehyde | ⟶ | formaldehyde cyanhydrin | + | acetone |
| Benzaldehyde cyanhydrin | + | butyraldehyde | ⟶ | butyraldehyde cyanhydrin | + | benzaldehyde |

When the reaction is performed in accordance with condition (1) the products of the reaction may be separated from each other and from the reactants by any suitable means such is distillation, extraction, crystallization or the like. The reactants may be mixed in molar proportions or an excess of one of the reactants may be employed. A common solvent may also be employed if desired. Other conditions for the reaction will depend upon the particular compounds used.

Another method of causing the reaction to go to completion is to carry out the reaction in accordance with condition (2), that is, to displace the equilibrium continuously toward the right. This may be done in instances where one of the products may be separated from the reaction medium continuously as formed. The most convenient means of accomplishing this result is to distill off a low boiling product of the reaction. For example, if acetone cyanhydrin is reacted with methyl propyl ketone in the presence of an alkaline catalyst and the acetone which is formed by the cyanhydrin interchange is continuously removed by fractional distillation, methyl propyl ketone cyanhydrin is obtained in good yields.

The substance used as the catalyst for the general reaction of this invention may be any alkaline catalyst such as a hydroxide, oxide, carbonate or cyanide of an alkali or alkaline earth metal or an organic alkaline compound such as pyridine. Only small amounts of the catalyst are necessary.

In the practice of this invention the initial aldehyde or ketone cyanhydrin, A, may be prepared by any of the known means for preparing such compounds. The preferred method is to prepare the cyanhydrin, A, by the reaction of aqueous hydrogen cyanide (or a cyanide plus an inorganic acid in aqueous solution) with the aldehyde or ketone. In this method use is made of a ketone or aldehyde which is immiscible with the aqueous hydrocyanic acid solution or whose cyanhydrin may be salted out of an aqueous salt solution. As a result the cyanhydrin of the aldehyde or ketone is extracted from the water phase by the unreacted aldehyde or ketone. Hydrogen cyanide itself is also extracted from the water phase and substantially all the hydrogen cyanide is found in the non-aqueous phase together with the cyanhydrin. For example if a solution of hydrogen cyanide, or a solution containing metallic cyanide and an inorganic acid, be treated with methyl ethyl ketone, in excess over that required to form the cyanhydrin, two layers are formed and over 90% of the hydrogen cyanide will be found in the ketone phase present either as ketone cyanhydrin or as dissolved hydrogen cyanide. Further extractions with ketone will remove practically all of the hydrogen cyanide from the water phase.

The ketone layer prepared in this way is then used as the ketone cyanhydrin, A, in a preferred embodiment of this invention. For example, acetaldehyde may be reacted with the methyl ethyl ketone layer containing methyl ethyl ketone cyanhydrin, and possibly hydrogen cyanide, as prepared above to yield acetaldehyde cyanhydrin (lactonitrile) and methyl ethyl ketone. These may be separated by distillation and the recovered methyl ethyl ketone may be reused. Other ketones such as methyl propyl ketone, methyl isobutyl ketone and dipropyl ketone have also been used in this process with good results. The overall yield of acetaldehyde cyanhydrin by this method is high, usually over 80% and frequently as high as 95%.

This method is particularly adapted to the preparation of low molecular aldehyde cyanhydrins such as formaldehyde cyanhydrin and acetaldehyde cyanhydrin since these compounds are obtained only with difficulty and in unsatisfactory yields by other methods. Since acetaldehyde cyanhydrin (lactonitrile) may be conveniently prepared by this reaction, this invention provides a convenient route to the preparation of acrylontrile since acetaldehyde cyanhydrin may be acetylated and then pyrolzed to this compound.

The particular conditions to be used in the practice of this invention may be illustrated by the following preferred embodiments of the invention. It is to be understood however, that these examples are not intended in any way to limit the invention to the specific compounds or conditions described therein.

*Example 1.*—Fifty parts (1 mole) of 95% sodium cyanide in 100 parts of water and 100 parts (1.4 moles) of methyl ethyl ketone are treated with 54 parts (.55 mole) of 96% sulfuric acid in 100 parts of water. The temperature is kept at 45° C. during the addition of the acid. The mixture is stirred 10 minutes while the temperature falls to 40° C. Two layers are formed which are separated. The upper non-aqueous layer is mixed with 0.5 part of sodium cyanide and then 45 parts (1.05 moles) of acetaldehyde are added. The mixture is stirred for one-half hour after which 1 part of 95% sulfuric acid is added and the mixture is distilled. A 90% yield of acetaldehyde cyanhydrin based on the sodium cyanide is obtained.

Example 2.—Fifty parts of pure acetaldehyde are run into 104 parts of methyl ethyl ketone cyanhydrin containing 0.5 part of sodium carbonate as catalyst, and the mixture is stirred at 40° C. for one hour. 5 parts of 75% phosphoric acid are then added to prevent decomposition of the cyanhydrin and the mixture is distilled. An 88% yield of acetaldehyde cyanhydrin is obtained. (63 parts B.P. $_{20\ mm.}$ 90°–96° C.)

Example 3.—Fifty four parts (.55 mole) of 96% sulfuric acid in 100 parts of water are added to a mixture of 50 parts (1 mole) of 95% sodium cyanide, 100 parts of water and 100 parts (1.4 moles) of methyl ethyl ketone at a temperature maintained between 40 and 45° C. The mixture is stirred for 10 minutes. Upon subsequent standing two liquid layers form which are separated. The upper non-aqueous layer is then mixed with 85 parts (1.05 moles) of 36% formalin. Solid sodium cyanide (.5 part) is added and the mixture is stirred for one hour at 30–35° C. A single liquid phase is present. 3 parts of phthalic anhydride are added and the mixture is distilled at reduced pressure. Forty-six parts of formaldehyde cyanhydrin (B. P. $_{18\ mm.}$ 101–103° C.) corresponding to an 83% yield are obtained. In this example phthalic anhydride is added to prevent decomposition of the cyanhydrin during distillation since a stronger acid leads to polymerization and tar formation.

I claim:

1. The process which comprises reacting a cyanhydrin having both the cyano and the hydroxyl groups on the same carbon atom with a compound of the class consisting of aldehydes and ketones in the presence of an alkaline catalyst to form another similar cyanhydrin and another compound of the class consisting of aldehydes and ketones.

2. The process which comprises reacting a cyanhydrin having both the cyano and the hydroxyl groups on the same carbon atom with a compound of the class consisting of aldehydes and ketones in the presence of an alkaline catalyst to form another similar cyanhydrin and another compound of the class consisting of aldehydes and ketones, and continuously removing one of the products of the reaction.

3. The method of preparing a cyanhydrin having both the cyano and the hydroxyl groups on the same carbon atom from a similar cyanhydrin having a greater dissociation constant which comprises treating the second cyanhydrin with a compound of the class consisting of aldehydes and ketones in the presence of an alkaline catalyst and thereafter separating the products of the reaction.

4. The method of preparing a cyanhydrin having both the cyano and the hydroxyl groups on the same carbon atom which comprises extracting an aqueous solution of hydrocyanic acid with a compound of the class consisting of water insoluble aldehydes and ketones, separating the non-aqueous layer containing the cyanhydrin of said compound and hydrogen cyanide, reacting said layer with a compound of the class consisting of aldehydes and ketones, in the presence of an alkaline catalyst and driving the reaction to completion by continuously removing one of the products of the reaction.

5. The method of preparing a cyanhydrin having both the cyano and the hydroxyl groups on the same carbon atom which comprises treating an aqueous solution of cyanide with an inorganic acid and a compound of the class consisting of aldehydes and ketones whose cyanhydrins may be salted out of aqueous solutions, separating the non-aqueous layer containing the cyanhydrin of said compound and hydrogen cyanide, treating said layer with a compound of the class consisting of aldehydes and ketones whose cyanhydrins have a smaller dissociation constant than the cyanhydrin of the first named compound, in the presence of an alkaline catalyst and thereafter separating the products of the reaction.

6. The method of preparing an aldehyde cyanhydrin from a ketone cyanhydrin which comprises treating said ketone cyanhydrin with an aldehyde in the presence of an alkaline catalyst and thereafter separating the ketone and the aldehyde cyanhydrin thus formed.

7. The method of preparing a cyanhydrin of a low molecular alkyl aldehyde which comprises treating a ketone cyanhydrin with said aldehyde in the presence of an alkaline catalyst and thereafter separating the cyanhydrin of said aldehyde and the ketone thus formed.

8. The method of preparing acetaldehyde cyanhydrin which comprises reacting another cyanhydrin having both the cyano and hydroxyl groups on the same carbon atom with acetaldehyde, in the presence of an alkaline catalyst.

9. The method of preparing acetaldehyde cyanhydrin which comprises reacting a ketone cyanhydrin with acetaldehyde in the presence of an alkaline catalyst.

10. The method of preparing acetaldehyde cyanhydrin which comprises reacting aqueous sulfuric acid, sodium cyanide and methyl ethyl ketone, separating the methyl ethyl ketone layer containing methyl ethyl ketone cyanhydrin and hydrogen cyanide, treating said layer with acetaldehyde in the presence of an alkaline catalyst and thereafter separating the acetaldehyde cyanhydrin and the methyl ethyl ketone.

11. The method of preparing formaldehyde cyanhydrin which comprises reacting a ketone cyanhydrin with formaldehyde in the presence of an alkaline catalyst.

12. The method of preparing formaldehyde cyanhydrin which comprises reacting aqueous sulfuric acid, sodium cyanide and methyl ethyl ketone, separating the methyl ethyl ketone layer containing methyl ethyl ketone cyanhydrin and hydrogen cyanide, treating said layer with formaldehyde in the presence of an alkaline catalyst and thereafter separating the formaldehyde cyanhydrin by distillation.

FREDERICK E. KÜNG.